INVENTORS
DAVID O. HOWE
JAMES E. ETZEL
BY ARCHIE P. MILLER

*ATTORNEYS*

United States Patent Office 3,300,404
Patented Jan. 24, 1967

3,300,404
ANAEROBIC TREATMENT OF ORGANIC INDUSTRIAL WASTES IN AN ARTIFICIAL LAGOON
David O. Howe, Terre Haute, James E. Etzel, Dayton, and Archie P. Miller, Terre Haute, Ind., assignors to Commercial Solvents Corporation, a corporation of Maryland
Filed Apr. 23, 1964, Ser. No. 362,097
5 Claims. (Cl. 210—11)

The present invention relates to the treatment of industrial wastes, and more particularly to a system for the simultaneous conversion and purification of industrial water streams, especially by anaerobic biological degradation of organic wastes, e.g. major fermentation wastes, in a lagoon.

There are presently available several potentially feasible processes for treating industrial wastes including activated sludge, trickling filtration, anaerobic digestion, spray irrigation, lagooning, wet oxidation, etc. Each of these processes, however, has its own special limitations and disadvantages.

One of the most attractive processes for treatment of industrial wastes is that of lagooning. This process, which involves the use of large holding basins, can be accomplished either aerobically or anaerobically depending upon the degree of organic loading imposed. In the latter process, the organic or industrial waste material is decomposed anaerobically, i.e. by anaerobic bacteria which are active in the absence of dissolved molecular oxygen, to give gases, e.g. methane, carbon dioxide, hydrogen sulfide, ammonia, etc., and liquid decomposition products. Aerobic treatment utilizes aerobic bacteria which are active only in the presence of dissolved molecular oxygen, e.g. dissolved oxygen in the industrial wastes. Simplicity is the chief advantage of the lagoon process since it is a single-unit operation which can accomplish biological stabilization of the pretreated wastes and simultaneously achieve solids separation by simple sedimentation. Solids removal from the lagoon is necessary periodically, e.g. at intervals of several years when inorganic precipitates are present.

The relative merits of the aerobic and anaerobic lagoon processes are chiefly evaluated on the basis of the available land area required for the holding basin. An aerobic lagoon, limited by oxygen transfer to an organic bacterial-oxygen-demand (BOD) loading of about 50 lb./acre/day, requires an area which depends upon the quantity of waste to be treated. Bacterial-oxygen-demand or "BOD" is a standardized method for estimating the degree of contamination of water supplies. In contrast to aerobic lagooning, however, it has been found that an anaerobic lagoon requires a substantially smaller area for high-strength wastes, e.g. an organic loading of about 500 lb./acre/day for an anaerobic lagoon. Anaerobic treatment is generally better suited than aerobic treatment for handling of high-strength wastes because of the ability of the microorganisms to use combined oxygen (usually present in abundance as soluble oxygenated anions) rather than dissolved oxygen, as contrasted with aerobic treatment which requires dissolved molecular oxygen. The ability of anaerobes to use combined oxygen eliminates the need for the aeration required in aerobic treatment, an inefficient process at best.

Although lagooning appears to be an advantageous and economical process several disadvantages have, in the past, presented difficulties which discouraged the commercial use of anaerobic lagooning on a large scale. Firstly, anaerobic digestion requires a relatively long detention time, e.g. 15 to 30 days, for stabilization of the BOD content of the waste. Additionally, heretofore anaerobic digestion was believed to be very inefficient at low temperatures and, when this factor was combined with the long detention time, it was felt that anaerobic lagoons, which due to size are of necessity located out-of-doors, were of limited value and could only be used in the summer. Some of the anaerobic lagoons used heretofore have had, for example, an efficiency of between about 70 and 80 percent in summer, i.e. reduce the BOD by 70 to 80 percent, which drops to between about 20 and 30 percent in winter. Consequently, most sewage-plant anaerobic digestion processes have, in the past, involved tanks which are operated under controlled temperatures of about 35° C. Further disadvantages of anaerobic processes known heretofore include the production of odorous gases, e.g. hydrogen sulfide.

It has now been discovered, however, that anaerobic lagoons can be efficiently operated at ambient temperatures as low as 5° C. in contrast to the elevated temperatures commonly used in sewage-plant digesters, with a reduction in BOD of from at least about 60% to 80% depending upon the ambient temperature, by development of the anaerobic flora at ambient temperatures. It has been illustrated that the efficiency of such flora is less sensitive to temperature changes than the flora used heretofore. This aspect of operation of an anaerobic lagoon is important since there are wide seasonal variations in temperature over most parts of the world and operation of the lagoon within wide temperature variations allows use of the lagoon winter and summer. In most parts of the United States, for example, the temperature seldom stays below 5° C. for any length of time so that the anaerobic lagoon of the present invention does not need an alternate plant to assume the waste treatment in winter.

In routine anaerobic digestion the temperature is maintained artificially high to favor the growth of the methane formers. When control of the temperature is lost, however, the lagoon drops suddenly to ambient temperatures and the lagoon "sours" with a corresponding drop in the speed of stabilization of the wastes to an unacceptably low value. In the instant lagooning process the lagoon is operated at ambient temperatures, particularly at low temperatures. A controlling factor in being able to operate the lagoon at low temperatures is the control of the lagoon as to pH, and the monitoring of the lagoon to control the alkalinity and volatile acid relations to each other within the range of: alkalinity—0.833 volatile acid salts=>zero; preferably within the range: alkalinity—2[0.833 volatile acid salts]=>zero. Another factor in the instant lagooning process is that the lagoon remains at ambient temperatures at all times, therefore, the mixed culture adjusts to the more slowly changing temperatures thereby maintaining a high efficiency rate.

Additionally, it has been found that the formation of gases having undesirable odors can be suppressed by the addition of relatively small amounts, e.g. 500 p.p.m., of nitrate ion as ammonium nitrate or nitric acid, in the industrial waste feed to the lagoon. The amount of nitrate ion depends upon the combined oxygen content of the waste and the amount of odor control desired.

Objectionable odors result from the anaerobic organisms reducing non-objectionably odorous compounds, particularly $SO_4^{++}$ to $H_2S$, or other objectionably odorous derivatives. When ammonium nitrate or nitric acid is added in the proper quantity, the anaerobic organisms reduce the nitrate ion instead of the objectionable odor-containing compounds. The quantity of nitrate material required may well vary with the composition of the wastes and must be determined and controlled, since too little fails to control odors, while an excess may reduce the efficiency of the stabilization of the wastes as the mixed culture will adjust to the nitrate level instead of stabilizing the waste compounds as desired. Looking at the waste stream discharging into the lagoon as the feed to the lagoon, then the nitrate level in the particular feed described hereinbelow is advantageously maintained at or near about 400 to 800 p.p.m. of $NH_4NO_3$ or $HNO_3$ to be particularly effective in controlling objectionable odors. The addition of the nitrate material will control all odors tested, particularly formation of hydrogen sulfide from the sulfate present in the wastes. The addition of nitrate ion ($NO_3^-$) as $NH_4NO_3$ or $HNO_3$ also gives some pH control from the ammonium ion ($NH_4^+$) or the hydrogen ion ($H^+$) which is advantageous since it is desirable to adjust the pH of the feed to near neutrality, generally from about pH 6.5 to 7.5, and preferably pH 6.8 to 7.2.

It is a primary object of the present invention to provide an improved anaerobic lagooning process for the treatment of industrial wastes. It is a further object of the present invention to provide an anaerobic lagooning process which operates within a wide range of ambient temperatures. It is also an object of the present application to provide a simple and inexpensive method for controlling the odors rising from anaerobic lagoons. Other objects and advantages of the present invention will become apparent from the detailed description hereinbelow.

In general, the lagoon proper of the present invention is an artificial lake divided into several channels, e.g. four, by earthen walls or partitions at about ground level height. Staggered openings in each partition allow the liquid waste to enter the first channel, flow around the partition and down the second, up the third, etc. The feed in the first channel passes through settling areas for the solid matter contained therein formed by dams, or baffles, in the flow channel having a height slightly lower than operating level. The lagoon is inoculated with supernatant liquor obtained from an anaerobic digester to speed the starting up procedures for the lagoon and the anaerobic flora are developed at ambient temperatures. The lagoon could easily be started by natural development of flora, but this would require a much longer starting-up procedure. Feed wastes are introduced in the first channel where solids in the feed settle-out and collect in the areas behind the dams. The anaerobic process digests the organic matters in the feed wastes as they move through the channels; however, as the wastes flow farther and farther down the lagoon it contains less and less food for the anaerobic bacteria. Consequently, the anaerobic bacteria eventually work themselves out of a job and the aerobic bacteria begin to take over.

The anaerobic lagooning process of the present invention is very advantageous since it is comparatively inexpensive and versatile and can solve the waste water problems of many industries, particularly those having major fermentation wastes. The major chemical constituents of such wastes can include water; zinc sulfide; bacterial and fungal cells and mycelium; ammonium and sodium sulfates, carbonates, bicarbonates, nitrates and chlorides; glutamic acid (unrecovered residues); sugar; alanine; O-carbamyl-serene; amino acids, peptides, and similar nitrogenous residues; bacitracin (unrecovered residues); slowly fermentable carbohydrates, lignins, fibers, etc.; butanol; calcium acetate, propionate, etc.; phosphates; etc. The lagooning process of the instant invention can result in the lowest capital investment per daily pound of biochemical oxygen demand (BOD) treated, requiring about $25 per daily pound of BOD as against $125 for other and more conventional methods, or a saving of about 80 percent. The system of the present invention requires a minimum of supervision, electric or other power, and maintenance; consequently operational costs are very low. There is no temperature control problem. In the present system the anaerobes continue to function at near top efficiency in waste water temperatures ranging from about 25° C. (77° F.) down to 5° C. (41° F.). Additionally, there is no odor problem.

Figure 1:
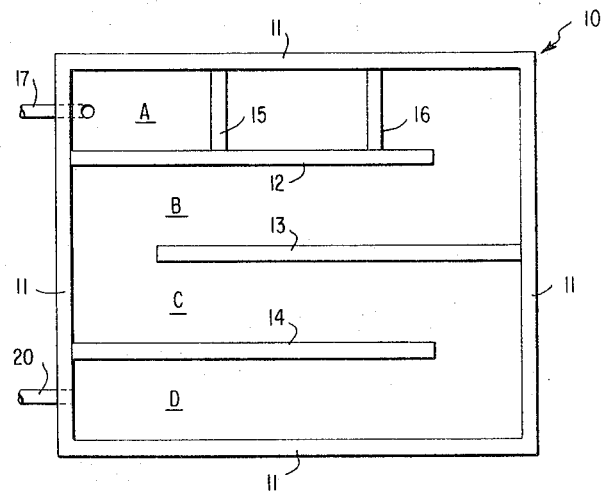
FIGURE 1 is a simplified representation of the lagoon of the present invention.

The lagoon 10, as illustrated in FIGURE 1, consists of an essentially rectangular area of about 20 acres within walls or dikes 11 arranged to maintain a maximum depth of four feet. The area is divided by three partitions or levees 12, 13 and 14 into a flow path containing four channels A, B, C, and D, each about 250 feet wide. An ingress means, inlet 17, is provided in channel A and an egress means, outlet 20, is provided at the outlet at the end of the fourth channel D. Two dams 15 and 16 are constructed in the first path A near the feed inlet 17 and divide path A into three portions. The dams are less than the maximum depth of the lagoon. Dam 15, for example, is approximately 3 feet high and dam 16 is approximately 1 foot high. These dams form two settling areas for removal of solids contained in the industrial waste liquors. Both dams are submerged when the lagoon is at its operating depth and the liquid feed wastes flow over the same. The solids will be dredged from behind these dams at necessary intervals.

After construction of the lagoon proper, the anaerobic process is started by introducing industrial wastes through inlet 17 and inoculating the lagoon with supernatant liquor obtained from an anaerobic digester or other anaerobic waste treatment process, e.g. from the pilot lagoon described below. The industrial waste liquors are pumped, or otherwise introduced, into the lagoon 10 at inlet 17. The industrial waste liquors treated in the lagoon 10 are the combined wastes from the individual process streams, particularly major fermentation wastes, e.g. wastes remaining after production of glutamic acid, bacitracin, and/or cycloserine, etc., by fermentation and the subsequent formation therefrom of, for example, monosodium glutamate. In the individual process waste streams for which the specific lagoon under description is designed, the biochemical oxygen demand (BOD) ranges from 10 p.p.m. to over 12,000 p.p.m. or more, and the pH varies from 3.5 or less to 10.5 or more. In the industrial waste streams fed to the lagoon the pH is stabilized at from a pH generally of about 6.5 to 7.5, usually a pH of 6.8 to 7.2. The BOD of the combined waste streams is about 10,000 p.p.m. and the suspended solids, most of which are settleable, is in excess of 30,000 p.p.m. The volume of contaminated waste effluent to be subjected to treatment amounts to a flow of approximately 150,000 gallons per day containing an organic loading of about 9,000 pounds of BOD. The particular BOD, amount of feed, etc., may be varied within wide limits with only minor changes in the lagoon, particularly in the size of the lagoon. The lagoon 10 is designed to operate at about 80% reduction in BOD with a retention time of approximately 180 days. With the expected 80% reduction in BOD, the total discharge from the lagoon outlet 18 will be in the order of 1800 lbs. or 10,000–11,000 population equivalents, even well below, for instance a normally desired objective of 20,000 to 25,000 population equivalents.

In order to illustrate the effects of various conditions upon the anaerobic lagoon process of the present invention, a pilot scale lagoon was operated. The pilot lagoon was a scaled down version of the full size lagoon 10 except that there were five paths instead of four. The surface dimension of the pilot lagoon was arbitrarily set at 4 ft. x 4 ft. The pilot scale lagoon was located indoors, and was constructed in water-tight fashion from tongue-and-groove lumber. The inside was treated with a varnish primer followed by two coats of an epoxy resin paint.

Four baffle walls 4 ft. high extending into the tank from alternate sides forced the feed to travel through five paths in its passage to the effluent. In the first path a submerged partition 3 feet high was constructed 1.3 feet from the influent end, and a second partition 1 foot high was downstream another 1.3 feet. The partitions served as dams behind which the settleable solids from the feed were expected to collect. This was one to maintain the floor of the lagoon downstream relatively free of such solids.

The pilot lagoon was filled with approximately 480 gallons of water from a cooling-water collection pond. Feed was continuously introduced at the rate of two gallons during 24 hours. To compensate for surface evaporation, distilled water was dripped into the lagoon at the influent end at a rate such that the effluent from the lagoon was maintained at 2 gal./day. The lagoon was inoculated with about fifteen gallons of supernatant liquor obtained from an anaerobic digester at the municipal sewage-treatment plant in Bloomington, Indiana. The addition of the inoculum completed the start-up operations.

Sampling of the lagoon contents at various depths was achieved through glass tubes clamped in fixed position at twenty-five different locations along the length of the flow path. By means of samples siphoned from selected positions, the progress of the activity of the waste-treatment process in the body of the lagoon was monitored. In addition to samples of feed and effluent, the following locations were routinely sampled for assay:

(a) Upstream of first partition; depth varied as solids accumulated;

(b) Mid-point, first path; 6″ depth;
(c) End, first path; 6″ depth;
(d) End, first path; 44″ depth;
(e) Mid-point, third path; 6″ depth; and
(f) End, fifth path; 42″ depth.

The effluent outlet from the lagoon at the end of the fifth path was a pipe passing through the wall at surface level, but with its intake submerged one inch. The outlet pipe was vented to prevent siphoning, and the effluent was allowed to drip freely into the collection reservoir. During its passage through the pipe there was opportunity for some aerobic microbial activity to occur in the thin liquid film. At least once weekly a 24-hour composite effluent was sampled for BOD assay; samples for other analyses were taken more frequently, sometimes daily.

The following analyses were carried out on the lagoon samples according to methods described in "Standard Methods for the Examination of Water and Wastewater," 11th edition: pH; alkalinity to pH 4.4, calculated as $CaCO_3$; biochemical oxygen demand (BOD). The analysis for volatile acids, calculated as acetic acid, was by the method of Etzel and Pohland in Public Works 91, 105–108 (July 1960). Oxidation-reduction potential was measured with a platinum electrode against a calomel half-cell standardized with quinhydrone buffered at pH 4.5. Concentrations of metal ions were determined by methods specific for each cation under study.

The lagoon feed was composited from manufacturing process waste streams. The BOD of the feed was adjusted to approximately 10,000 p.p.m. Toxic heavy-metal ions which might be present were converted by pretreatment to an innocuous form. Since the feed was non-homogeneous, solids were kept in suspension by mild agitation in the feed reservoir.

During the early stages of the lagoon study it was found that the addition of at least about 500 p.p.m. of ammonium nitrate in the feed was sufficient to suppress formation of hydrogen sulfide from the sulfate present in the wastes. Thereafter this supplementation was used routinely. pH of the feed was adjusted to within the range of 6.8 to 7.2.

Of primary importance in the start-up of the lagoon is the maintenance of the waste at ambient temperatures, rather than at elevated temperatures. Most sewage-plant digesters are operated at about 35° C., primarily for culture of the methane-forming anaerobes. These organisms are known to be thermophilic, and thus their efficiency decreases markedly with a temperature decrease of only a few degrees. By development of the anaerobic flora of the pilot lagoon at ambient temperatures, the efficiency of such flora is less sensitive to temperature changes. This aspect of operation is important in the full-scale lagoon where wide seasonal variations in temperature occur.

Figure 2:
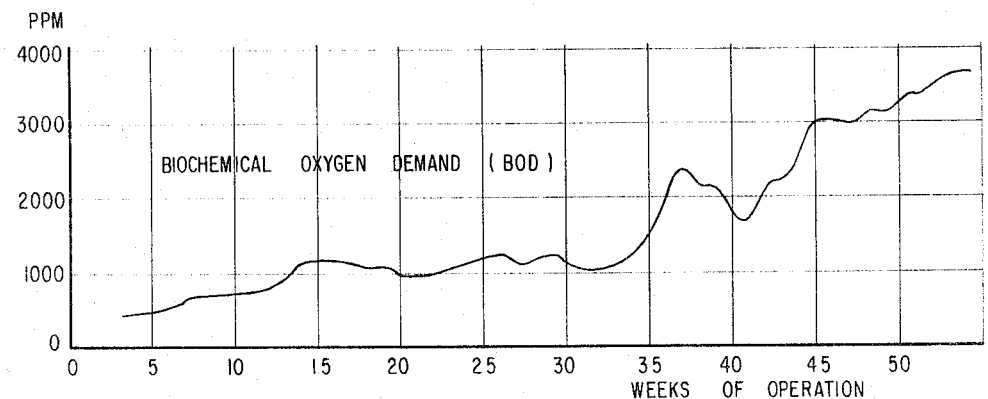
FIGURE 2 is a graph plotting the biochemical oxygen demand (BOD) against weeks of operation of a pilot lagoon employing the teachings of the present invention.
Figure 3:
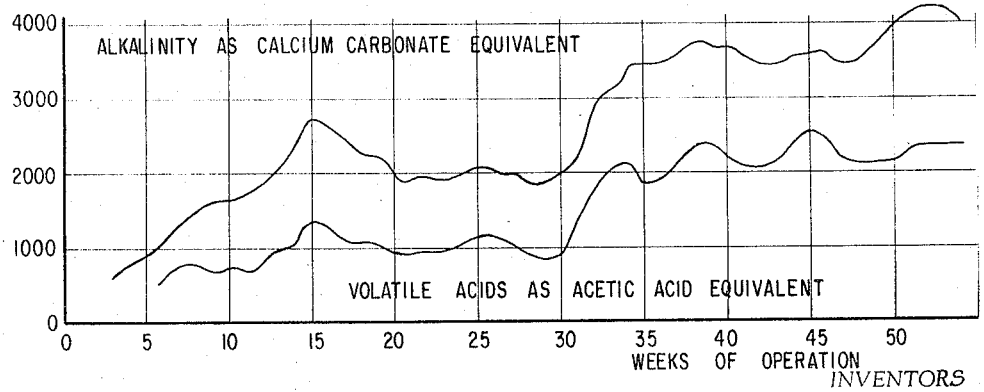
FIGURE 3 is a graph plotting the alkalinity as calcium carbonate equivalents and the volatile acids as acetic acid equivalents against weeks of operation of the pilot lagoon.

Initially the lagoon was allowed to operate at temperatures which varied between 19 and 25° C. but approximated 22° C. For later studies an insulated room was constructed around the tank, and a refrigerating unit maintained the room and lagoon temperature at desired levels of 15°, 10°, and 5° C. The results are summarized in FIGURES 2 and 3.

The pH of the pilot lagoon maintained itself within the desired limits of 7.0±0.2 without adjustment after operation was established. Similarly, routine measurements of oxidation-reduction potential confirmed that anaerobic conditions prevailed.

During the first sixteen weeks of operation, the pilot lagoon was allowed to operate at the variable ambient temperatures, with the liquid temperature never exceeding 25° C. The BOD assays throughout the lagoon showed a gradual rise from about 40 p.p.m. of the pond water as the feed components diffused as illustrated by Table I. During the last few weeks of this period there was a reduction in this rate of increase, which indicated that the concentration of BOD was approaching an equilibrium value.

TABLE I.—ASSAYS OF EFFLUENT FROM THE PILOT LAGOON [1]

[Running average of 4-week data]

| No. of Weeks Operated | Biochemical Oxygen Demand, p.p.m. | Alkalinity as Calcium Carbonate Equivalent, p.p.m. | Volatile Acids as Acetic Acid Equivalent, p.p.m. |
| --- | --- | --- | --- |
| 4 | 382 | 761 | |
| 5 | 471 | 944 | |
| 6 | 514 | 1,104 | 672 |
| 7 | 580 | 1,361 | 799 |
| 8 | 694 | 1,648 | 831 |
| 9 | 705 | 1,718 | 745 |
| 10 | 735 | 1,813 | 786 |
| 11 | 778 | 1,858 | 747 |
| 12 | 824 | 2,033 | 803 |
| 13 | 934 | 2,290 | 1,019 |
| 14 | 1,142 | 2,529 | 1,148 |
| 15 | 1,191 | 2,933 | 1,414 |
| 16 | 1,226 | 2,879 | 1,407 |

[1] No Temperature Control; Average 22° C.

The trends in the volatile acids and alkalinity were indicative of the establishment of a balanced anaerobic environment during the period of Table I. In the anaerobic stabilization of organic matter the initial phase is the conversion of complex compounds into volatile acids. Coincident with this must be the conversion of nitrogenous materials to ammonia, so that the volatile acids can be neutralized upon formation. Thus a gross change in the pH of the surrounding environment of a balanced waste fermentation remains in the desired range of pH 6.8 to 7.2.

The feasibility of anaerobic lagooning was considered at this point to be well enough established so that operation could be simulated under the less favorable temperature conditions to be encountered in winter. Following the 15th week, the lagoon temperature was lowered over a period of ten days to 15° C. as illustrated in Table II. From the 16th to about the 30th week the effluent BOD tended to stabilize at about 1,200 p.p.m. During the same period the volatile acids and alkalinity stabilized at about 1,000 p.p.m. and 2,200 p.p.m., respectively. This period of relative stability indicated that anaerobic activity had achieved a measure of equilibrium under the prevailing operating conditions. Reduction in the BOD content was estimated to be at least the 80% desired.

TABLE II.—ASSAYS OF EFFLUENT FROM THE PILOT LAGOON [1]

[Running average of 4-week data]

| No. of Weeks Operated | Biochemical Oxygen Demand, p.p.m. | Alkalinity as Calcium Carbonate Equivalent, p.p.m. | Volatile Acids as Acetic Acid Equivalent, p.p.m. |
|---|---|---|---|
| 17 | 1,153 | | |
| 18 | 1,046 | 2,519 | 1,166 |
| 19 | 1,038 | 2,450 | 1,133 |
| 20 | 951 | 2,209 | 999 |
| 21 | 950 | 2,003 | 879 |
| 22 | 955 | 2,067 | 926 |
| 23 | 1,074 | 2,031 | 951 |
| 24 | 1,172 | 2,164 | 1,051 |
| 25 | 1,253 | 2,236 | 1,144 |
| 26 | 1,262 | 2,213 | 1,172 |
| 27 | 1,154 | 2,216 | 1,135 |
| 28 | | 2,001 | 948 |
| 29 | 1,267 | 2,038 | 901 |
| 30 | 1,146 | 2,173 | 975 |
| 31 | | 2,563 | 1,416 |
| 32 | | 3,118 | 1,861 |
| 33 | | 3,437 | 2,082 |
| 34 | 1,342 | 3,742 | 2,256 |
| 35 | 1,627 | 3,690 | 2,040 |
| 36 | 2,014 | 3,747 | 2,103 |
| 37 | 2,544 | 3,814 | 2,261 |

[1] Temperature held at 15° C.

About the 28th week a major change in the lagoon feed composition occurred. This change in feed consisted of a marked decrease in the ammonium ion concentration and substitution for it of an increased sodium ion concentration (about 20,000 p.p.m.). As can be noted this feed change started to affect the balanced environment of the pilot lagoon by the 30th week, and by the 37th week the BOD had increased to about 2,500 p.p.m. At the same time the volatile acids had increased to 2,300 p.p.m. and the alkalinity to 3,800 p.p.m. This represented the peak of the disturbance, since by the 41st week the BOD had decreased again to about 1,700 p.p.m.

The concentrations of BOD, alkalinity, and volatile acids at intermediate sampling points along the lagoon path during the 37th week showed that the lagoon was acclimatizing to the changed feed. Thus the studies were continued at further reduced temperatures. The temperature was lowered in five days during the 38th week to 10° C., and finally to 5° C. in a period of five days during the 40th week. This 5° C. temperature was maintained during the remaining fourteen weeks of the study. The initial rather rapid rise in BOD of the effluent was not unexpected in view of the 10-degree temperature change. The rate of increase slowed after about five weeks, and BOD effluent concentration leveled off at about 4,000 p.p.m. This corresponds to an operational efficiency of about 60% based on the feed concentration of 10,000 p.p.m. of BOD. During this same period the alkalinity and volatile-acids concentrations tended to remain relatively stable-alkalinity within the range of 3,700–4,300 p.p.m., and the volatile acids within the range of 2,200–2,700 p.p.m.

TABLE III.—ASSAYS OF EFFLUENT FROM THE PILOT LAGOON

[Temperature lowered to 10° C.]

| No. of Weeks Operated | Biochemical Oxygen Demand, p.p.m. | Alkalinity as Calcium Carbonate Equivalent, p.p.m. | Volatile Acids as Acetic Acid Equivalent, p.p.m. |
|---|---|---|---|
| 38 | 2,292 | 3,961 | 2,466 |
| 39 | 2,259 | 4,096 | 2,616 |
| 40 | 1,984 | 4,018 | 2,456 |

TABLE IV.—ASSAYS OF EFFLUENT FROM THE PILOT LAGOON

[Temperature held at 5° C.]

| No. of Weeks Operated | Biochemical Oxygen Demand, p.p.m. | Alkalinity as Calcium Carbonate Equivalent, p.p.m. | Volatile Acids as Acetic Acid Equivalent, p.p.m. |
|---|---|---|---|
| 41 | 1,694 | 3,951 | 2,286 |
| 42 | 2,172 | 3,768 | 2,223 |
| 43 | 2,368 | 3,708 | 2,298 |
| 44 | 2,531 | 3,786 | 2,495 |
| 45 | 3,147 | 3,808 | 2,715 |
| 46 | 3,203 | 3,875 | 2,647 |
| 47 | 3,147 | 3,747 | 2,334 |
| 48 | 3,310 | 3,701 | 2,314 |
| 49 | 3,260 | 3,841 | 2,331 |
| 50 | 3,447 | 4,115 | 2,325 |
| 51 | 3,550 | 4,224 | 2,523 |
| 52 | 3,733 | 4,278 | 2,494 |
| 53 | 3,840 | 4,255 | 2,517 |
| 54 | 3,860 | 4,010 | 2,498 |

The pilot-lagoon studies demonstrate that anaerobic stabilization is possible in a lagoon, and that an overall reduction in BOD of from at least 60% to about 90% could be achieved, depending on the temperature of operation, within a wide range of ambient temperatures.

Incidental observations indicated that the solids level behind the first dam reached 25 inches after about 25 weeks, and reached the top of the dam (36 inches) about eight weeks later. No significant depth of solids was noted behind the second dam while the first dam was filling. At the conclusion of the test period the second dam had received solids in excess of its one-foot height. The floor of the lagoon downstream also contained several inches of solids since no solids were removed even after the dams filled. In the full scale lagoon the solids are periodically removed.

Variations and modifications, as already pointed out or otherwise, are possible within the scope of the invention; and parts of the improvements may be used without others.

It is claimed:

1. In a method for the biological treatment of organic industrial wastes to reduce the BOD by the action of anaerobic bacteria in an artificial lagoon having a flow path therethrough open to ambient conditions, said flow path having an area equal to about one acre for approximately each 500 pounds/day of organic loading, the improvement of inoculating said lagoon at ambient temperatures with anaerobic bacteria, feeding said industrial wastes to the inlet of said lagoon, said feed wastes at the inlet of said lagoon having a pH of about 6.5 to 7.5, substantially continuously flowing said industrial wastes through said flow path at ambient temperatures to anaerobically digest said organics and decrease the BOD thereof, and controlling the flow rate of said feed wastes to maintain the alkalinity and volatile acid relations of said lagoon expressed as calcium carbonate equivalents and acetic acid equivalents, respectively, within the range of: (alkalinity equivalents) − (0.833 volatile acid salts equivalent) = >zero, said ambient temperature being from about 25° C. to about 5° C., and thereafter removing the industrial wastes of reduced BOD from the lagoon.

2. The method of claim 1 wherein solids contained in said industrial wastes are retained in the first portion of said flow path.

3. The method of claim 1 wherein the industrial waste feed to said lagoon comprises major fermentation wastes having a total volume of about 150,000 gallons per day with an average BOD of about 9000 pounds, said lagoon having an area of about 20 acres, said wastes being retained in the lagoon for approximately 220 days.

4. The method of claim 1 further including the addition to said lagoon of a compound selected from the group consisting of ammonium nitrate and nitric acid in an amount sufficient to provide an amount of nitrate ion effective to suppress undesirable odors arising from said lagoon.

5. The method of claim 4 wherein about 400 to 800 p.p.m. of said compound are added.

References Cited by the Examiner

UNITED STATES PATENTS

| | | | |
|---|---|---|---|
| 866,094 | 9/1907 | Vial | 210—532 |
| 1,095,409 | 5/1914 | Mann et al. | 210—532 |
| 1,223,004 | 4/1917 | Starr | 210—16 |
| 1,331,735 | 2/1920 | Wilson | 210—16 |

OTHER REFERENCES

Albertson: Ammonia Nitrogen and the Anaerobic Environment, Journal WPCF, September 1961, vol. 33, pp. 978–995.

Canham: Anaerobic Treatment of Food Canning Wastes, Proc. Fifth Industrial Waste Conf., 1949, Purdue Univ., pp 145–158.

Neel et al.: Experimental Lagooning of Raw Sewage, Sewage and Industrial Wastes, vol. 28, November 1956, pp. 1326–1356, pp. 1326–1340 and 1353–1356.

Pierce: Symposium on Waste Stabilization Lagoons, Water and Sewage Works, vol. 107, October 1960, pp. 408–411.

Symposium on Food Canning Wastes, Proceedings of the First Industrial Waste Utilization Conf., Purdue Univ., 1944, pp. 158–160 relied on.

MORRIS O. WOLK, *Primary Examiner.*

MICHAEL E. ROGERS, *Examiner.*